Sept. 26, 1961    W. L. ELTON ET AL    3,001,249
MULTIPLE GLASS SHEET GLAZING UNITS
Filed Oct. 1, 1959    2 Sheets-Sheet 1
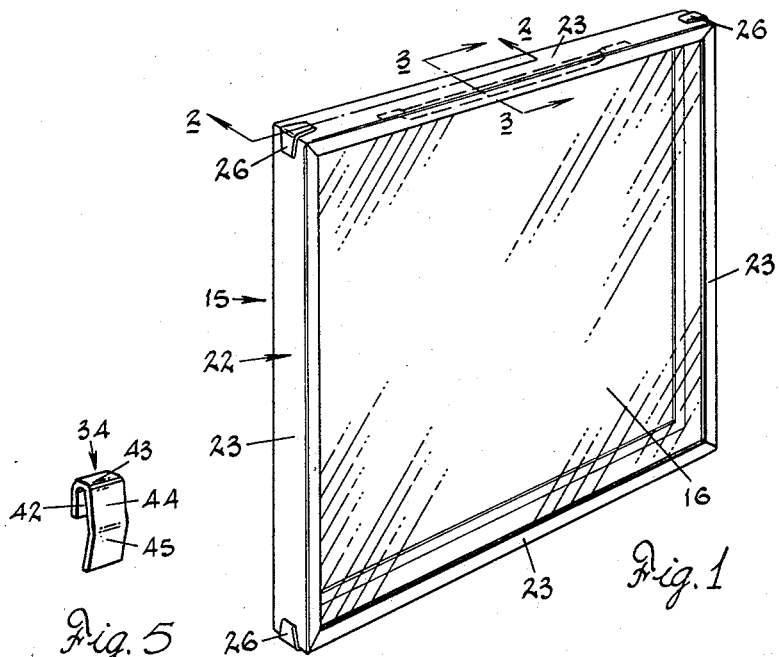
Fig. 1
Fig. 5
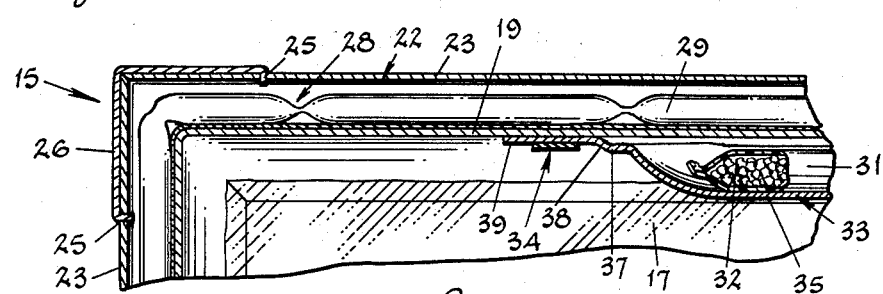
Fig. 2
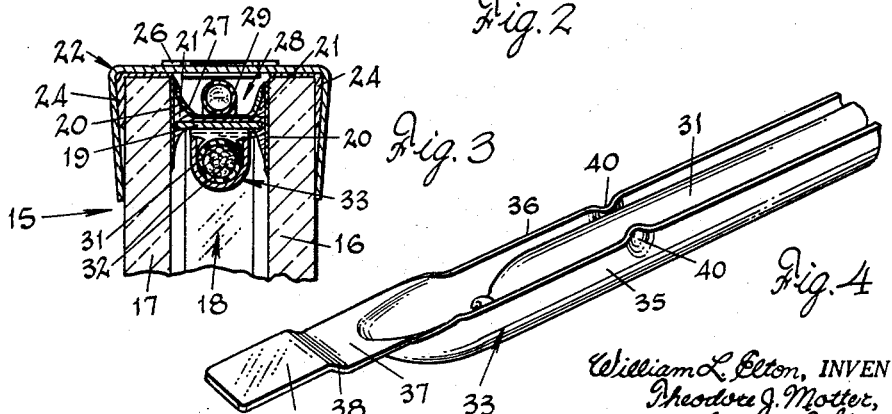
Fig. 3
Fig. 4
William L. Elton, INVENTORS
Theodore J. Motter,
BY James D. Gwyn and
Howard F. Hoeckel
Nobbe & Swope
ATTORNEYS

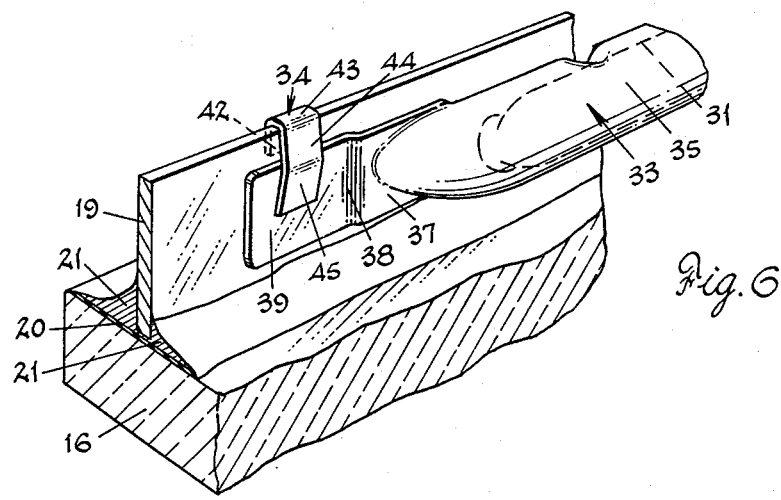
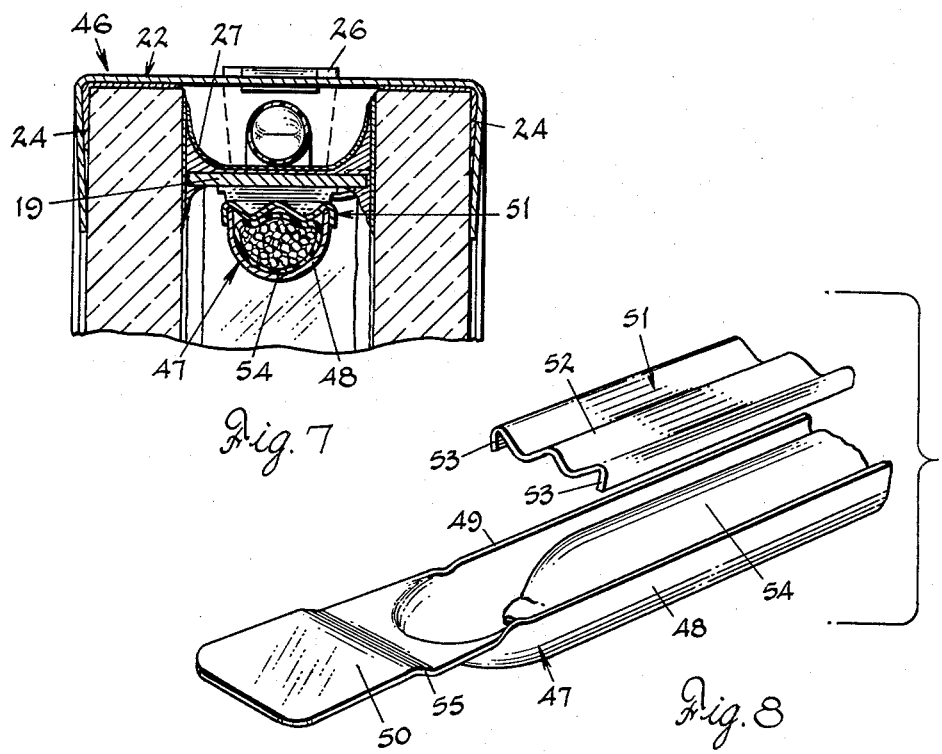

United States Patent Office 3,001,249
Patented Sept. 26, 1961

3,001,249
MULTIPLE GLASS SHEET GLAZING UNITS
William L. Elton, Maumee, Theodore J. Motter, Genoa, and James D. Gwyn, Perrysburg, Ohio, and Howard F. Goeckel, Temperance, Mich., assignors to Libbey-Owens-Ford Glass Company, Toledo, Ohio, a corporation of Ohio
Filed Oct. 1, 1959, Ser. No. 843,692
10 Claims. (Cl. 20—56.5)

The present invention relates to improvements in multiple glass sheet glazing units.

The general type of glazing unit with which this invention is concerned comprises spaced sheets of glass which are hermetically sealed together around the edges thereof to form a dead-air space or chamber therebetween which may be filled with dehydrated air or other gas, or exhausted to provide a partial vacuum. Such multiple glass sheet glazing units are well known and have been widely used to reduce heat transfer and to prevent condensation of moisture upon the glass in glazed openings.

The efficiency and success of this type of glazing unit has been dependent largely upon maintaining the space between the glass sheets hermetically sealed since should this seal be broken, or even the slightest leak develop, thereby permitting atmospheric air or water vapor to enter between the sheets, the insulating value of the unit would be materially reduced. Perhaps the most objectionable feature of the very small leaks that may develop, for one reason or another, in hermetically sealed multiple sheet glazing units is that sooner or later the unit will begin to exhibit moisture condensation on the inside surfaces of the glass sheets. In some instances, the leak may be so small that it is undetectable by the standard manufacturing tests used to determine whether or not newly produced units are air-tight. Or such a leak may result from improper handling or installation of the unit. Consequently, the unit may appear to be perfectly satisfactory and only after continuous use over a relatively long period of time, does the tell-tale condensation appear which shows that the unit has become defective. This situation is, of course, extremely disturbing both to the manufacturer and to the users of such units.

It is recognized that the broad idea of employing dehydrating or desiccant containing means in multiple sheet glazing units to absorb water vapors from the air contained in or entering the unit has been previously proposed. However, one deficiency that known devices of this character have always had results from the fact that the desiccant material used is generally permitted to pick up moisture from the atmosphere at some time or other during the fabrication of the glazing unit and/or the installation of the desiccant in the unit.

It is therefore an important object of this invention to effectively overcome these difficulties and to improve the quality, utility and life expectancy of multiple glass sheet glazing units by the provision, inter alia, of an improved form of built-in dehydrating means for such units.

Another object of the invention is to provide, in a multiple glass sheet glazing unit, an improved desiccant container together with novel means for securing said container between the glass sheets.

Another object of the invention is to provide a novel desiccant container formed of a moisture-permeable plastic material such that the rate of transmission of moisture therethrough can be effectively controlled to determine the rate of absorption or adsorption by the desiccating material.

Another object of the invention is to provide such a desiccant container in the form of a tubular member formed of plastic closed at its opposite ends, in conjunction with novel means for supporting and securing it between the glass sheets.

A further object of the invention is to provide in a multiple glass sheet glazing unit including at least two sheets of glass maintained in spaced parallel relationship by separator means positioned therebetween, an improved desiccant container of the above character together with means for securing said container to the separator means in a manner to permit expansion and contraction thereof.

Other objects and advantages of the invention will become more apparent during the course of the following description when read in connection with the accompanying drawings.

In the drawings wherein like numerals are employed to designate like parts throughout the same:

FIG. 1 is a perspective view of a multiple glass sheet glazing unit constructed in accordance with this invention;

FIG. 2 is a vertical longitudinal sectional view taken on line 2—2 of FIG. 1;

FIG. 3 is a vertical transverse sectional view taken on line 3—3 of FIG. 1;

FIG. 4 is a fragmentary perspective view of a desiccant container;

FIG. 5 is a perspective view of a securing member;

FIG. 6 is a diagrammatic view showing the installation of the desiccant container;

FIG. 7 is a vertical transverse sectional view of another form of desiccant container; and FIG. 8 is a fragmentary perspective view of the desiccant container employed in FIG. 7.

With reference now to the drawings and particularly to FIGS. 1 to 3, there is disclosed one form of multiple glass sheet glazing unit, designated in its entirety by the numeral 15, with which the present invention can be employed. Such a unit comprises two sheets or plates of glass 16 and 17 arranged in spaced, face-to-face relation to provide an air space or chamber 18 therebetween. This air space is formed by the provision of a metal separator strip 19 arranged entirely around and inwardly of the edges of the glass sheets 16 and 17 and joined to the inner surfaces of the said sheets through the intermediary of metallic coatings 20.

Multiple glass sheet glazing units of this general character may be fabricated substantially as set forth in the patent to C. D. Haven et al., No. 2,235,681, issued March 18, 1941. Briefly stated, the marginal portions of the inner surfaces of the two glass sheets are provided with tightly adherent metallic coatings 20 upon which is applied a layer of solder. A separator means, such as the strip 19, formed of lead or a lead alloy and suitably coated with a layer of solder, is placed on edge on the metallic coating of one of the glass sheets inwardly of the edges thereof. A suitable heating means, as a soldering iron, is then run along the juncture of the spacer strip 19 and the metallic coating on the glass sheet to melt the solder layers and thus produce fillets 21 along the opposite sides of the separator strip.

As the solder layers blend or amalgamate, the resulting fillets 21 become permanently adherent to the separator strip and the metallic coating on the glass sheet to establish a hermetic bond therebetween. The first glass sheet, such as the sheet 16, with the separator strip 19 united therewith, is then placed in an inverted position on a second glass sheet, such as the sheet 17, whereupon melting of the solder layers joins the separator strip to the second glass sheet to provide a multiple glass sheet glazing unit.

After assembly of the unit has been completed, it is customary to insert hypodermic needles or the like through the separator strip 19 and into the space 18 between the glass sheets to remove the air therefrom and to replace it with dehydrated air or a suitable inert gas; and to then seal the openings with drops of solder. This is to eliminate, as completely as possible, any moisture from the sealed air space and thereby maintain the inwardly disposed glass surfaces free from condensation.

In order to protect the edges and corners of the glass sheets 16 and 17 from accidental damage or breakage incurred during handling, a frame 22 is provided around the glazing unit 15. This frame may be formed of a plurality of metal channel sections 23 that are preferably adhered to the edges of the glass sheets and cushioned therefrom by layers 24 of a high molecular weight organic polymer clay composition or other adhesive material.

Any suitable metal, such as stainless steel or aluminum, may be used in forming the channel sections 23. As shown in FIG. 2, each of the channel sections is provided with a slot 25 in the web thereof adjacent its ends. When the channel sections 23 are placed around a glazing unit, as shown in FIG. 1 or FIG. 2, metal clips 26 are snapped into the slots 25 thus firmly interconnecting the ends of the adjoining channel sections 23 to form the protective frame 22.

Preparatory to assembling the channel members 23 in place, a high molecular weight organic polymer-microcrystalline wax coating composition is preferably spread over the metallic separator 19 and the solder fillets 21 to form a moisture-resistant film 27 that will protect the metal from any moisture which may collect in the channel 28. This composition has been found to be highly desirable as a vapor barrier as it effectively prevents moisture from coming in contact with the metallic separator strip 19 and metal fillets 21 and is also readily applied since it forms a homogeneous liquid upon heating.

In order to protect the unit from extreme pressures which may be built up in the channel 28 should moisture be present therein under freezing conditions, there is positioned in the channel 28 a flexible tube 29 of polyethylene which is sealed at both of its ends. The resiliency of the tube acts to absorb any pressure built up with the channel of the unit due to ice formation, thereby relieving the hermetic seal between the metal separator and glass sheets from this pressure.

However, all of these precautions may go for nought if even the slighest undetectable leak is present when the unit is fabricated or thereafter develops from improper handling or installation, or from other causes beyond the control of the manufacturer. Therefore, it is the purpose of this invention to provide improved means for protecting a unit of this character from any moisture that might collect in the air space by continuously adsorbing the same as fast as it may enter the unit. Accordingly, and prior to joining the separator strip 19 to the second glass sheet 17, a sealed container 31 containing a desiccant material 32 is mounted on and in spaced relation to the inner surface of the separator strip by means of a support case 33 that is attached to the separator by attaching clips 34.

The desiccant container 31 is in the form of a tube of polyethylene plastic material closed at its opposite ends. Polyethylene is of particular utility since it has a controllable factor of water vapor permeability depending upon its density and thickness. A polyethylene tubular container can be easily formed by extrusion and lends itself readily to heat sealing. It is also relatively inexpensive and contains no plasticizers.

Several compositions have been found suitable for desiccating purposes and include activated alumina, anhydrous calcium sulphate, silica gel and others. It has, however, been found that so-called molecular sieves, made up of sodium alumino silicates and calcium alumino silicates, either separately or combined, have a remarkable capacity for rapid adsorption and length of activity.

The support case 33 illustrated particularly in FIG. 4 may be of aluminum or other metal and comprises an elongated body portion 35, the wall 36 of which is substantially U-shaped in cross-section. This results in the formation of a channel in which the tubular polyethylene desiccant container 31 is received. A substantial portion of the container 31 is exposed to afford as complete use as possible of the moisture permeable surface thereof for transmission of any water vapor that may be present in the unit.

The body portion 35 of support case 33 is shaped at each of its ends to provide a substantially flat flange or ear 37 formed with an integral step portion 38 which terminates in an attaching tab 39 upwardly off-set from the flange portion 37. The size and length of the support case 33 are of course dependent upon and determined by the size and length of the tubular plastic container 31 required for a calculated amount of desiccant material. Now, when the tubular container 31 has been placed, as shown in FIG. 4, in the support case 33, the marginal edges of the wall 36 are suitably crimped, as at 40, and preferably at several spaced points along the length of the body 35, to loosely confine the tubular container within the case.

During assembly of a multiple glass sheet glazing unit as disclosed in FIG. 6, and after the separator strip 19 has been secured around the peripheral edges of one glass sheet, a support case 33 is positioned along and adjacent the inner surface thereof. Apparently there is no particular area of the unit in which the dehydrating influence of the desiccant material can better be carried out, so that for all practical purposes the support case 33 can be installed on any portion of the separator strip.

The support case 33 is secured to the separator strip 19 by means of the clips 34. One form of clip, as shown in FIG. 5, is substantially J-shaped and includes a relatively short leg 42, a web or bight portion 43 and a relatively longer leg 44 which is bent substantially midway between the web 43 and the outer end of the leg to form an inwardly deflected terminal portion 45. When mounting the support case, it is positioned with the open side thereof facing the separator strip and with the attaching tabs 39 bearing against said strip. Because of the off-set web portions 38, this will position the body 35 of the support case in slightly spaced relation to the separator strip so that the tubular desiccant container 31 will be exposed to the interior of the unit. The attaching clips 34 are then fitted over the separator strip as shown in FIG. 6, with the short leg 42 thereof bearing against the outer surface of the separator strip and the outer end 45 of the longer leg 44 bearing against the attaching tab 39 pressing it against the inner surface of the separator strip. The bend in the leg 44 causes the outer end 45 thereof to exert a positive though resilient pressure against the attaching tabs 39.

When the melting of the solder layers is carried out along the juncture of the edge of the separator strip and the metallic coating on the second glass sheet, and particularly in the vicinity of the clips 34 at each end of the support case 33, the leg 42 and bight portion 43 of each clip will be embedded within the solder fillets 21. The clips are, of course, made of very thin metal so as not to interfere with the securing of the separator strip to the glass sheet. This firmly secures the clips 34 in position with respect to the separator strip 19. Also by reason of the fact that the tab portions 39 of the case 33 are held by the clamping action of the inwardly disposed leg portions 45 of the clips, the support case is not fixedly secured to the separator strip. This is important since upon any relative expansion or contraction between the glass sheets, the separator strip and the support case, due to any differences in their thermal characteristics, the tab portions 39 will be permitted to slip relative to the associated clips 34 so that the mounted relation between the support case and separator strip will not be adversely affected.

As is well known, multiple sheet glazing units are produced in a variety of dimensional sizes and also with air spaces of different widths. Consequently, the amount of desiccant material to be incorporated therein will vary with the size of the unit and width of air space and this will determine the size of the polyethylene container to be used. By way of example only, in the unit illustrated in FIG. 3 the glass sheets may be 1/8" thick and the air space between the two glass sheets 1/4", with the size of the unit being 18" x 36". In such a unit, a polyethylene tube of a given diameter, density, wall thickness and length and containing a predetermined amount of desiccant to give the desired moisture vapor absorption and/or adsorption factor would be used. On the other hand, if the unit is of larger dimensional size, for example 36" x 48", and has an air space of 1/2", as shown in FIG. 7, the polyethylene tube would ordinarily be of a larger diameter, greater length and contain a larger amount of desiccating material. Because of the increased length of the tube and the added weight of the desiccating material, a slightly modified type of support case may be provided for holding the polyethylene tube as illustrated in FIGS. 7 and 8.

In assembling the glazing unit 46 illustrated in FIG. 7, a support case 47 is employed which is of greater length and formed to provide a body portion of relatively larger capacity. In this case, the requirement for a body portion 48 to receive a desiccant container of larger diameter is compensated for by the provision of a suitably enlarged U-shaped cross-section of the wall 49. The body portion 48 of support case 47, however, as with the support case 33, terminates at its opposite ends in similarly formed attaching tabs 50. Now, with a proportionate increase in the length of plastic tubing required in keeping with the amount of desiccant material calculated for a unit having an air space of relatively larger volume and in view of the relatively thin gauge material from which the support case is formed, there may be some sagging between the ends thereof. This is of course objectionable from an appearance standpoint but more particularly the sagging effect could tend to shorten the length of the case with a resultant disengagement of the case from the associated attaching clips at one or both of its ends and consequently dislodging of the desiccant container.

To materially reduce, if not entirely eliminate, this possibility, provision is made to reinforce at least the body portion 48 of the case 47 by the use of a closure member or cover 51. As shown in FIG. 8, the cover may be formed with longitudinally disposed corrugations 52 and with integral downwardly directed longitudinal flanges 53. After insertion of the tubular container 54, filled with the desiccant material, into the support case, the cover 51 is attached thereto by rolling the flanges 53 downwardly into relatively fixed positions over the edges of the case wall 49 as shown in FIG. 7. Accordingly, the cover is adapted to operate as a strut across the open side of the support case and, in association therewith, provides a support member of materially stronger characteristics. The cover member does not extend the entire length of the support case but terminates inwardly of the opposite ends of the body portion 48 so that the tubular container 54 will be exposed to any water vapor within the unit.

Another advantage in utilizing the closure or cover member 51 is that when a glazing unit 46, as shown in FIG. 7, is being assembled, such a cover member serves as a barrier against the transmission of heat to the polyethylene container during soldering of the metal spacer strip to the second glass sheet. Despite the fact that the mounting tabs 50 of the case 47 are off-set from the body portion 48 by the integral step portions 55, the size of the tubing or container 54 may cause the exposed wall surface thereof to be otherwise disposed in relatively close proximity to the inner surface of the separator strip. As indicated in FIG. 7, the cover 51, when attached to the case 47, actually deforms the relatively thin tube or desiccant container 54 so that it will interfit with and be confined within the body portion 48 of the case.

It will be understood that the present invention is not restricted to the use of any specific polyethylene. However, two different types of polyethylene have been found to be satisfactory and these are known as Du Pont's Alathon 20 produced by E. I. du Pont de Nemours & Company, Wilmington, Delaware, and Spencer 2405 produced by Spencer Chemical Co., Kansas City, Missouri. The Du Pont Alathon 20 polyethylene has a density of 0.920 and Spencer's 2405 polyethylene a density 0.929.

A series of tests were conducted to determine the water vapor permeability of these two types of polyethylene tubing in .005" and .010" thicknesses under 80% R.H. In each case, the tubing was 7/32 inch O.D., 9 inches long closed at its opposite ends and containing 3.0 grams of 14 x 30 molecular sieves. This tubing is ordinarily used in double glazing units having a 1/2" air space. The following Table I shows the actual moisture pickup in grams (g.) over a period of days at 80% R.H.

TABLE I

| Sample No. | Exposure Time—80% R.H., days | Alathon 20, g. | | Spencer 2405, g. | |
| --- | --- | --- | --- | --- | --- |
| | | .005" | .010" | .005" | .010" |
| 1 | 4 | .0121 | .0054 | .0150 | .0044 |
| 2 | 4 | .0122 | .0053 | .0113 | .0039 |
| 3 | 4 | .0113 | .0053 | .0124 | .0040 |
| Average | 4 | .0119 | .0053 | .0129 | .0041 |
| 1 | 17 | .0618 | .0347 | .0783 | .0263 |
| 2 | 17 | .0636 | .0358 | .0585 | .0216 |
| 3 | 17 | .0596 | .0334 | .0637 | .0213 |
| Average | 17 | .0617 | .0346 | .0668 | .0231 |

Another series of tests were conducted on 1/8" O.D. Alathon 20 polyethylene tubing ordinarily used with double glazing units having an air space of 1/4". The tubing, closed at its opposite ends, had a wall thickness of 0.007", a length of 6 1/2 inches and contained 1 1/3 grams of molecular sieves. The thickness of the tubing in thousandths of an inch and the actual moisture pickup in grams over a period of days at 80% R.H. are recorded in the following Table II.

TABLE II

| Sample | Thickness | Pickup in Days at 80% R.H. | | | | |
| --- | --- | --- | --- | --- | --- | --- |
| | | 3 | 7 | 11 | 14 | 18 |
| 1 | .0061–.0069 | .0020 | .0070 | .0104 | .0133 | .0170 |
| 2 | .0056–.0068 | .0024 | .0065 | .0104 | .0128 | .0165 |
| 3 | .0058–.0070 | .0022 | .0069 | .0108 | .0134 | .0177 |
| 4 | .0062–.0068 | .0020 | .0066 | .0103 | .0136 | .0171 |
| 5 | .0059–.0069 | .0020 | .0066 | .0100 | .0131 | .0167 |
| 6 | .0058–.0068 | .0024 | .0061 | .0096 | .0127 | .0162 |
| Average Pickup | | .0022 | .0066 | .0103 | .0132 | .0169 |

The following Table III shows the actual moisture pickup in grams of six tubes of Spencer 2405 polyethylene, each having an outside diameter of 1/8", a wall thickness of .010", a length of 8 inches and containing 0.6 gram of molecular sieves.

TABLE III

| Sample No. | Exposure Time—80% R.H., days | Pickup in Grams |
| --- | --- | --- |
| 1 | 4 | .0023 |
| 2 | 4 | .0022 |
| 3 | 4 | .0020 |
| Average | 4 | .0022 |
| 1 | 7 | .0052 |
| 2 | 7 | .0048 |
| 3 | 7 | .0048 |
| Average | 7 | .0049 |

The above Tables I, II and III show the results of water vapor permeability tests on both du Pont's Alathon 20 and Spencer's 2405 polyethylene tubing in different diameters and wall thicknesses.

A number of double glazing units were made including the polyethylene tubing and molecular sieves, as the desiccating material, and the following examples are given to show the moisture pickup of the desiccating material in several typical units.

Example I

A polyethylene tube of 0.920 density, having an outer diameter of 7/32 inch, a wall thickness of .005" and a length of 9 inches, was filled with 3 grams of molecular sieves and sealed at its ends. The sealed tube was incorporated in a 36" x 48" glazing unit formed of two 1/4 inch glass sheets and having a 1/2 inch air space therebetween. The unit was initially dehydrated to a water vapor content of .0000169 gram per cubic inch equivalent to a dewpoint of +2° F. In a test period of about 5 days, the permeability or transmission capacity of the tube wall revealed that the vapor content in the air space between the glass sheets was reduced to .0000106 gram per cubic inch equivalent to a dewpoint of −7° F.

Example II

A double glazing unit similar to that described in Example I and containing a polyethylene tube having the same density, diameter, wall thickness and length and filled with 3 grams of molecular sieves was initially dehydrated to a water vapor content of .0000032 gram per cubic inch equivalent to a dewpoint of −28° F. In a test period of about 5 days, the water vapor content in the air space was reduced to .0000015 gram per cubic inch equivalent to a dewpoint of −40° F. It was also noted that the water vapor pressure in this unit was much less than the one in Example I which indicates the effectiveness of the polyethylene in allowing moisture or water vapor to pass therethrough even at very low water vapor pressures.

Example III

A double glazing unit 36" x 48" formed of 1/4 inch glass sheets and having a 1/2 inch air space was assembled with a polyethylene tube having a density of 0.920, an outer diameter of 7/32 inch, a wall thickness of .005", a length of 9 inches and containing 3 grams of molecular sieves. This unit was dehydrated to a water vapor content of .0000015 gram per cubic inch or an equivalent dewpoint of −40° F. Assuming that such a unit without any desiccant leaked at the rate of .0000227 gram of water vapor per cubic inch per year, at the end of one year it would contain .0000242 gram of water vapor per cubic inch and have a dewpoint of +9° F. However, if such a unit, subject to the same leakage, were provided with the dehydrating means above described, the unit, at the end of a year, would contain a water vapor content of less than .000001 gram per cubic inch because of the adsorptive capacity of the desiccant and also because the desiccant is contained in a material which permits the passage of water vapor faster than that which is entering the unit. Since it is known that molecular sieves will adsorb water vapor in quantities in excess of 15% of their weight, it is reasonable to assume that there is ample capacity for the desiccant material to maintain the unit at a low dewpoint for a number of years. In other words, the unit should be maintained in a dry condition until .45 gram of water vapor at least has been adsorbed by the desiccant material.

Example IV

A double glazing unit 18" x 36" formed of 1/8 inch glass sheets and having a 1/4 inch air space was provided with a polyethylene tube having a density of 0.920, an outer diameter of 1/8 inch, wall thickness of .005", 6 inches in length and containing 1 gram of molecular sieves. This unit was tested and found to have a water vapor content of .0000015 gram per cubic inch and a dewpoint of −40° F. It was assumed that at the end of one year this unit, due to leakage, would contain .0000242 gram of water vapor per cubic inch and have a dewpoint of +9° F. However, the polyethylene tube would permit the contained molecular sieves to adsorb moisture vapor at a much faster rate and therefore the amount of water vapor in the unit will be less than that initially and thus have a lower dewpoint. In fact, it was calculated that the desiccating material would keep the unit dry for a period of years at this rate of leakage, or as long as the total amount of water vapor entering the unit did not exceed the adsorptive capacity of approximately 15% of the weight of the desiccant.

As brought out above, it has been found that the use of a tubular desiccant container of polyethylene plastic is of particular utility in that, due to the permeable characteristic of polyethylene, the rate of transmission of moisture therethrough can be regulated to effectively control the rate of adsorption of water vapor by the molecular sieves. This control is determined by the thickness of the polyethylene used, the diameter of the tube, and the amount of desiccating material contained in the tube in relation to the width of the air space within the unit.

The use of polyethylene tubing also has the important advantage of initially protecting the desiccating material after it has been sealed in the tube but before the tube is assembled into a glazing unit. In other words, in normal factory operations, a certain period of time usually elapses between the filling of the tubes with the desiccant and the installation of the tubes in the glazing units, during which time the tubes may be exposed to an atmosphere of relatively high humidity. As indicated by the above tables, the moisture pickup of the polyethylene tubes over a period of a few days is relatively small so that the over-all effectiveness of the desiccant material is affected very little. Under normal assembly operations, a two-day period has been found to be an average, or even longer, period of time to be expected between preparation of the desiccant containing tubes and the installation thereof into the glazing units; the air space within the unit being dehydrated substantially immediately following final assembly. This protection of the desiccant from initial moisture adsorption prior to its assembly into the unit is an important feature of the invention since it enables the tubes to be filled in advance and temporarily stored pending installation into a unit.

It is to be understood that the forms of the invention herewith shown and described are to be taken as preferred embodiments of the same, but that various changes in the shape, size and arrangement of parts may be resorted to without departing from the spirit of the invention or the scope of the subjoined claims.

We claim:
1. A multiple glass sheet glazing unit, comprising two sheets of glass held in spaced face-to-face relation by separator means disposed around the edges thereof to form a closed air space therebetween, a tubular container formed of a moisture permeable plastic material disposed in said air space, and a desiccant material in said container.

2. A multiple glass sheet glazing unit as claimed in claim 1, in which the tubular container is formed of polyethylene.

3. A multiple glass sheet glazing unit, comprising two sheets of glass held in spaced face-to-face relation by a separator member disposed around the edges thereof to form a closed air space therebetween, a tubular container disposed in said air space, a desiccant material within said container, and means for supporting the tubular container on said separator member, said tubular container being formed of a moisture-permeable plastic material.

4. A multiple glass sheet glazing unit as claimed in claim 3, in which the tubular container is formed of polyethylene.

5. A multiple glass sheet glazing unit as claimed in claim 3, in which said last-named means comprises an elongated support case substantially U-shaped in cross-section and in which the tubular container is received and means for securing said support case to the separator member, with the open side of the support case facing the separator member and spaced therefrom.

6. A multiple glass sheet glazing unit as claimed in claim 5, in which said elongated support case is provided with off-set end portions and in which said securing means comprises clips for securing said end portions to the separator member in such a manner as to permit longitudinal expansion and contraction of said support case relative to said separator member.

7. A multiple glass sheet glazing unit as claimed in claim 6, in which each clip is provided with one leg portion rigidly fixed to the separator member and a second leg portion which yieldably engages an end portion of the support case to permit longitudinal expansion and contraction of said support case relative to said separator member.

8. A multiple glass sheet glazing unit, comprising two sheets of glass held in spaced face-to-face relation by a separator member disposed between the edges of the glass sheets to maintain them in spaced relation and to form a closed air space therebetween, a tubular container formed of a moisture permeable plastic material, a desiccant material in said container, an elongated support case substantially U-shaped in cross-section in which the tubular container is received, means for mounting the support case on the separator member, and means securing the separator member to the glass sheets and also securing the support case mounting means to said separator member.

9. A multiple glass sheet glazing unit as claimed in claim 8, in which the support case mounting means comprises attaching clips fitting over the separator member, each clip having a leg portion secured to the separator member and a second leg portion engaging said support case.

10. A multiple glass sheet glazing unit, comprising two sheets of glass arranged in spaced face-to-face relation, metallic coatings on the inner surfaces of the glass sheets around the marginal edge portions thereof, a metal spacer strip arranged between the glass sheets, solder fillets securing the metal spacer strip to the metallic coatings on the glass sheets to maintain said sheets in properly spaced relation and to form a closed air space therebetween, a tubular container formed of a moisture permeable plastic material, a desiccant material in said container, an elongated support case substantially U-shaped in cross-section in which the tubular container is received, said support case having off-set end portions, and means for mounting the support case on the metal spacer strip in spaced relation thereto and with the open side thereof facing said spacer strip, said last-named means comprising attaching clips, each clip fitting over the spacer strip and having a leg portion fixed thereto by said solder fillets and a second leg portion fitting over an off-set end portion of the support case to yieldably clamp it against said spacer strip.

References Cited in the file of this patent

UNITED STATES PATENTS

| | | |
|---|---|---|
| 2,235,681 | Haven et al. | Mar. 18, 1941 |
| 2,305,957 | Edwards | Dec. 22, 1942 |
| 2,925,633 | Morgan et al. | Feb. 23, 1960 |